United States Patent [19]
Kress

[11] Patent Number: 5,385,757
[45] Date of Patent: Jan. 31, 1995

[54] TRICKLE RESIN IMPREGNATION BY MIXING RESIN IN FREE FALL WITH A CURING AGENT

[75] Inventor: Willy Kress, Bisingen, Germany

[73] Assignee: Kress-Elektrik GmbH & Co. Elektromotorenfabrik, Bisingen, Germany

[21] Appl. No.: 869,938

[22] Filed: Apr. 15, 1992

[30] Foreign Application Priority Data

Apr. 19, 1991 [DE] Germany .............................. 4112776

[51] Int. Cl.[6] ............................................... B05D 1/30
[52] U.S. Cl. .................................... 427/420; 427/426; 427/422; 427/425; 118/300; 118/320
[58] Field of Search ............... 427/420, 426, 424, 425, 427/422; 118/320, 300, DIG. 4; 239/426, 418

[56] References Cited
U.S. PATENT DOCUMENTS

| | | | |
|---|---|---|---|
| 3,399,834 | 9/1968 | Bradley | 239/10 |
| 4,234,445 | 11/1980 | Hagen | 427/426 |
| 5,077,128 | 12/1991 | Bernard et al. | 427/426 |

Primary Examiner—Shrive Beck
Assistant Examiner—Katherine A. Bareford
Attorney, Agent, or Firm—Darby & Darby

[57] ABSTRACT

For the trickle resin impregnation of mainly electrical windings or of other components, electric motors, etc., containing electrical elements, a curing agent-free trickle resin is allowed to leave separately from an outlet opening to form a jet, which is flowing onto the object that is to be impregnated. Before the jet strikes the object, a curing agent may be sprayed onto the jet surface of the flowing trickle resin, so that trickle resin, mixed with curing agent, comes into contact exclusively with the object to be impregnated and not with any other object.

12 Claims, 1 Drawing Sheet

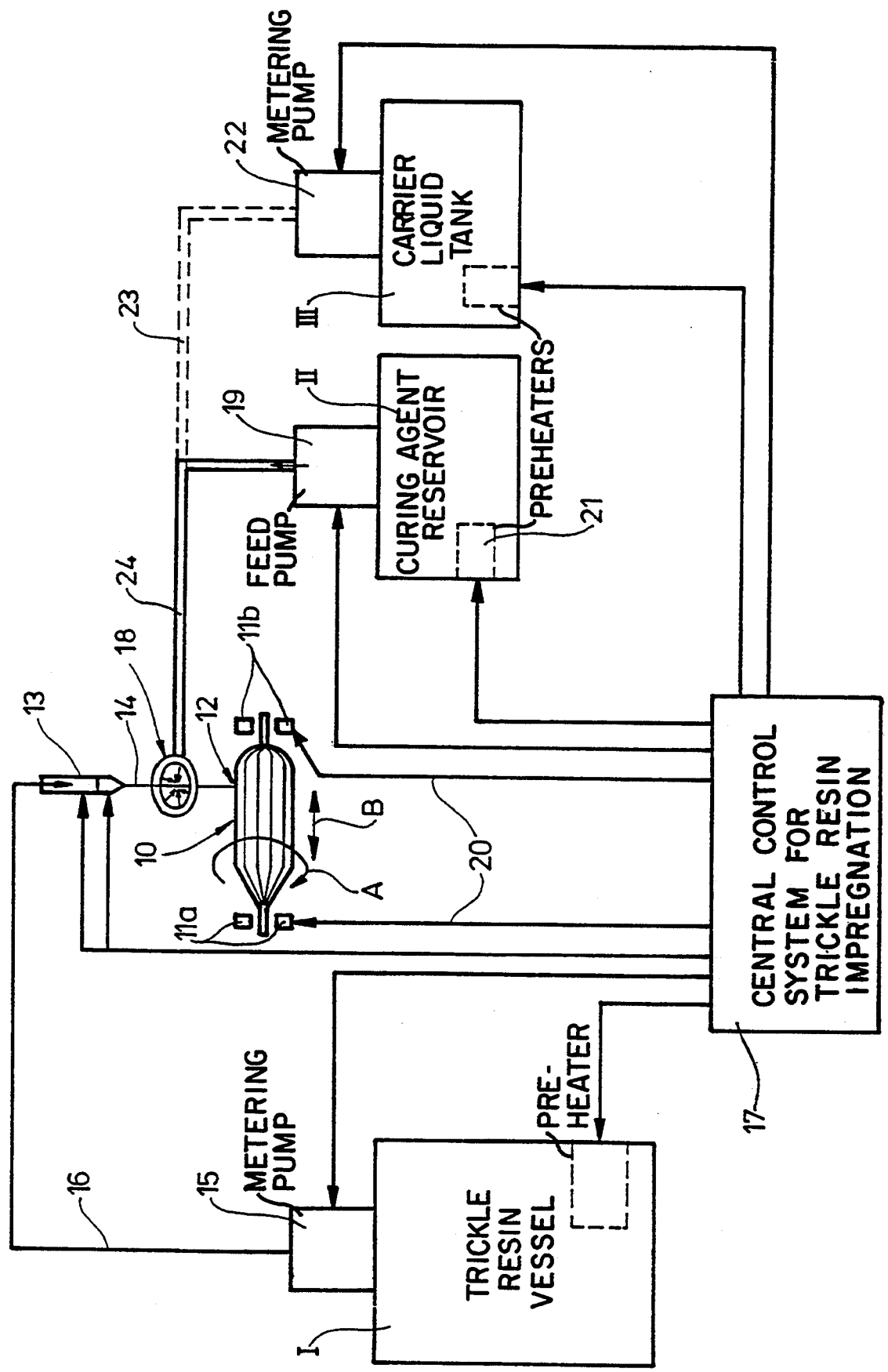

TRICKLE RESIN IMPREGNATION BY MIXING RESIN IN FREE FALL WITH A CURING AGENT

BACKGROUND OF THE INVENTION

1. Field of the Invention

The invention relates to a method for the trickle resin impregnation or parts containing electrical lines and an apparatus for implementing this method.

1. Discussion of Related Art

It is well known that electrical lines, electrical elements, etc. may be coated with a layer of resin or embedded completely in a protective resin composition for attaining supplementary insulation. For electrical lines which are subjected to dynamic stresses, such as windings of electric motors, that is, armature windings, stator windings, etc., supplementary mutual insulation can not only be provided by means of a so-called trickle resin impregnation with an external layer of resin, but may also be impregnated completely by the resin layer. This is done to obtain an effective protection, a particularly good stabilization of the windings and lines with respect to one another and, of course, to obtain the insulation previously mentioned.

Problems with such trickle resin impregnation methods arise because the resin composition, which is to be applied to the winding, such as an armature winding, should be sufficiently fluid so as to penetrate, as far as possible, into all the interstices and openings and to completely surround the lines. The resin should be kept sufficiently viscous, so that, during the impregnation, the resin will not drip off the windings. Above all, it is also necessary to ensure that after the resin impregnation is applied, the solidification of the applied composition preferably sets in immediately. For this purpose, a curing agent must be added in the appropriate dosage to the impregnating resin and, above all, mixed in well with it.

At least in the case of the impregnation of certain parts of electrical components, such an impregnating method can only be carried out intermittently. For example, in the trickle resin impregnation of the armature of an electric motor, when the treatment of the armature is finished, the armature must be carried away first, which is to be treated, is brought along. At this time, the impregnating stream of the resin is interrupted and other interruptions can not be excluded. Such interruptions, however, can cause the curing agent-containing resin to cure partially in the region of the outlet nozzle and, under some circumstances, to block the nozzle increasingly. In such an event, it is no longer possible to make do with the intermittent timing. On the other hand, if the amounts of curing agent are too small, adequately rapid stabilization of the liquid resin cannot be attained, which can create other problems.

In any case, the apportioning of the curing agent, which is to be added to the resin composition, is critical. For example, only one part of the curing agent for 99 parts of synthetic resin is to be used as a possible, usual formulation.

It is desirable to provide for the trickle resin impregnation of the armature winding of an electric motor, but the present invention is not limited to this special application. Instead, the invention comprises other possible applications no matter what part is to be impregnated. The synthetic resin, which is to be applied, flows through a free path which runs, for example, the outlet of a nozzle to the point at which it strikes the object that is to be impregnated.

SUMMARY OF THE INVENTION

The invention provides a method and an apparatus for the trickle resin impregnation of electrical lines or other modules, components, fittings, armature windings, etc., containing electrical parts. An object is to provide a problem-free impregnation, with high accuracy in metering out the curing agent that is to be added, is combined with rapid working cycles, without premature curing of the resin composition that is to be applied.

This invention has the advantage that the resin composition, mixed with the curing agent, does not come into contact with any processing part or equipment with the exception of the component itself, which is to be impregnated or coated. In this manner, it becomes impossible to be adversely affected by the premature curing of the resin.

In places where the resin could under some circumstances collect, for example, at an outlet metering-out nozzle, it can be wiped off again without problems. The reason is that the invention keeps the synthetic resin composition on the one hand and the curing agent on the other hand completely separate from each other up to the instant at which the synthetic resin, in free fall, covers the distance to the respective incidence point on the part that is to be impregnated, such as the armature of an electric motor. Only in the last instant is the curing agent, if desired, added in a highly accurate, metered amount. Nevertheless, it mixes intimately with the resin, because this resin has been adjusted to be adequately fluid. This mixing process before and during the meeting of the resin with the curing agent is ensured, because a ring nozzle is used. The liquid impregnating resin worm or jet flows through the center of the nozzle and the curing agent is sprayed onto the resin stream from the outside of the ring jet.

Due to the relative size relationships (the smaller and narrower the curing agent-free trickle resin impregnation jet, the larger is its surface area in relation to its mass) intimate wetting and thorough mixing of the trickle resin with the curing agent is obtained. This thorough mixing is then completed and improved when the resin and curing agent arrive at the place of destination and, as a consequence of other, mainly physical properties, reach even the smallest openings and cracks present, and cover surfaces of the work piece (through the action of adhesion). These are movements, which, at the same time, also favor further thorough mixing and wetting with the curing agent even of resin parts, which lie more within the jet. These movements take place within fractions of seconds after the trickle resin, which is free of the curing agent emerges as a jet from the supply nozzle and becomes wetted with the curing agent so that the chemical reaction of curing can commence.

Depending on the particular case, different amounts, rates and size dimensions, as well as the temperatures, can be used. The common basic characteristic is that the curing agent is added to the jet of synthetic resin only during the latter's free fall onto the object that is to be impregnated, that is, at the last possible moment, without providing any opportunity for the synthetic resin, which has been mixed with the curing agent, to come into contact with any other parts in the processing region. The only exception to this is the contact with the object that is to be impregnated.

Under certain circumstances, critical apportioning of the only very slight amounts of curing agents to be added (possibly of the order of only 1%), makes it advisable to add a carrier liquid to the curing agent. For its part, the carrier liquid is chemically inert, at least as far as the curing process itself is concerned. However, it significantly improves the ability to handle the curing agent itself. For example, the carrier liquid improves the spraying of the curing agent from the (ring) nozzle and the flow behavior of the curing agent.

At the same time, this carrier liquid may optionally contain resin-friendly components or partial components, which improve or favor the physical and chemical reactions between the resin and the curing agent. Alternatively, the carrier liquid may be a particularly volatile liquid, that is, one that evaporates readily, so that the carrier liquid disappears at the instant at which the trickle resin jet, at least the surface of which is wetted with curing agent, strikes the part that is to be impregnated. There are no limits set here to the empirical procedure. The initial viscosity, the amount of curing agent to be added, the length of the distance through which the jet of synthetic resin falls before it strikes the object, the rate of application, etc. are adjustments and dimensioning data, which can best be determined optimally through practical experience.

BRIEF DESCRIPTION OF THE DRAWING

A simple embodiment of the invention is given in the diagrammatic representation of the drawing and is explained in greater detail in the following description. The drawing diagrammatically shows the supplying of trickle resin composition and curing agent to a workpiece that is to be coated, namely the armature of an electric motor.

DESCRIPTION OF THE PREFERRED EMBODIMENT

During the trickle resin impregnation of objects, particularly of components of electric motors, etc., having electrical windings, such as armatures and stator windings, a jet of trickle resin, which is dimensioned in its diameter in accordance with the desired working speed, is applied on the object. The armature and the curing agent for the impregnating agent is admixed only at the instant at which the trickle resin leaves its assigned outlet opening or nozzle and heads, for example, in free fall (due to the action of gravity) for the object to be impregnated. This object moves below the outlet of the synthetic resin jet, which is now provided with the curing agent, in the respective, specified directions and can also rotate appropriately, so that complete impregnation is possible.

In the drawing, the object 10 is to be impregnated and is referred to in the following generally as an armature of an electric motor. This armature is preferably held on either side in suitable bearings 11a, 11b, the details of which are not described, for carrying out a rotational motion in accordance with the arrow A and optionally, at the same time, a longitudinal displacement in accordance with the double arrowheads B, so that the point of impact 12 of the trickle resin jet 14, flowing out of a suitable metering nozzle 13, moves over the surface of the armature 10 to the desired degree to achieve a comprehensive impregnation.

The curing agent-free trickle resin is in a first container or vessel I and can be conveyed, for example, by means of a pump 15 through a connecting conduit 16 of the metering nozzle 13. Alternatively, it is also possible and possibly even preferable to construct the pump 15 as a metering pump and to have the pumped trickle resin then leave, for example, freely at 13. The metering nozzle 13 may also be constructed as a magnetic valve, so that the metering possibilities are supplemented and the outflow of synthetic resin is clock controlled.

For this purpose, preferably an electrical or electronic central control system 17 is preferably provided, which appropriately controls the different working components of the trickle resin impregnation, optionally in response to a program. For this purpose, computer-controlled work cycles are then also realized within the central control system by means or an appropriate microprocessor controlled in turn, with stored values.

It is advisable to heat the trickle resin in container I appropriately, for example, by means of a heater, which is only indicated diagrammatically at 17 and is also controlled by the central control system with appropriate temperature sensors. By these means, a particular viscosity of the resin is achieved, which, in conjunction with the amount pumped in unit time by the metering pump 15 or because of the outlet cross section of the metering nozzle 13, leaves as a dimensioned jet 14 and reaches the object that is to be impregnated. The initially curing agent-free trickle resin is transferred to the object that is to be impregnated preferably by the action of gravity, that is, from above to below. The curing agent is added only at the instant at which it is certain that the emerging trickle resin jet 14 can no longer contact any other object, will; the exception of the object to be impregnated.

For this purpose, a nozzle 18 for applying the curing agent is provided. The curing agent is supplied by means of a further feed pump 19 from a curing agent reservoir II. The curing agent exits from appropriate nozzle openings and strikes the trickle resin jet falling through it. The curing agent application nozzle, which supplies the curing agent, can be constructed so that the curing agent is sprayed from only one side onto the trickle resin jet; preferably, however, this curing agent application nozzle is constructed as a ring nozzle, which at the same time is then positioned, so that the trickle resin jet, which is to be sprayed with curing agent, is guided approximately through the geometric center of the open ring nozzle. In this it is possible to provide appropriate small slots in the inner wall of the ring nozzle. These slots preferably are uniformly distributed. The curing agent, which is appropriately matched to the passage of the trickle resin, leaves the slots under appropriate pressure and strikes the surface of the trickle resin jet. Since both of the fluids, meeting at this place, are moving dynamically, there is a more or less intimate and comprehensive wetting between curing agent and trickle resin. After the trickle resin jet strikes the object 10 that is to be impregnated, this wetting is further intensified significantly, because of the abrupt braking of the rapidly moving jet. This abrupt braking causes various small kinetic forces to act on the jet, which then flies into pieces, runs and carries out movements in all directions. As a result, intimate wetting with the curing agent is obtained under all circumstances.

Simultaneously with this application, there is relative mechanical motion in random directions between the impinging point 12 of the trickle resin jet that is provided with curing agent and the surface of the object that is to be impregnated. If the object is, as mentioned, the armature of an electric motor, then this armature can carry out a rotational movement corresponding to arrow A at the same time that it carries out a longitudinal movement, so that impregnating resin is applied on all sides in rapid, clocked sequence, before the next armature is moved into place.

The different relative motions can be carried out in any manner known to those skilled in the art. It is also possible to control by way of the central control system in accordance with the arrows 20 movement of the bearings 11a, 11b, which support the object 10 that is to be impregnated, in order to arrive at a uniform, coordinated impregnating method, in which the rate of advance of the armature is also included.

It may also be advisable to adjust the curing agent to a desired temperature and viscosity by means of a suitable pre-heater 21. This can also be accomplished by means of the comprehensive control and regulation through the central control system 17, in the same way that the pump 19, which pumps the curing agent, is controlled. Here also, it is possible to construct the pump 19 as a metering pump or the metered application of the curing agent can be accomplished by adjusting the cross section appropriately in the region of the ring nozzle 18. Apportioning supply of at least one of the curing agent and the trickle resin free of the curing agent may be effected by controlled cross-sectional constrictions at respective outlets.

A further advantageous embodiment of the present invention results when, under some circumstances, a very small amount of the curing agent is added to the trickle resin arid is mixed with a carrier liquid already present in curing agent vessel II or at any convenient point later in time, while it is in the process of being supplied to the trickle resin. The carrier liquid can then also be kept in a further tank III, if it is supplied over a separate metering pump 22 and conduit 23, which is shown by a broken line in the area of the line 24 supplying the curing agent.

In order to specify some numerical values, which make it possible to gain a better conception but which, of course, do not limit the invention, it is pointed out that the normal amount of trickle resin for an average armature can lie in the range of, for example, 4.9 g. This amount of trickle resin then requires an amount of curing agent of only 49 mg for the curing. An effort should be made to adhere to this ratio as accurately as possible. The invention succeeds in this in a particularly satisfactory manner. Rapid working is also favored because, since the curing agent is added at the last moment before striking the object to be impregnated, it is possible to work here also with larger amounts of curing agents and a more rapid curing, so that the cycling rate for impregnation can be increased.

While the foregoing description and drawings represent the preferred embodiments of the present invention, it will be understood that various changes and modifications may be made without departing from the spirit and scope of the present invention.

What is claimed is:

1. A method of obtaining trickle resin impregnation of an object to be impregnated, comprising the step of: applying a jet of liquid synthetic resin and a curing agent on the object to be impregnated, the step of applying including supplying a trickle resin from an outlet opening and free of the curing agent, causing the trickle resin to flow in a path in free fall due to an action of gravity between said outlet opening and the object to be impregnated so as to strike the object to be impregnated, and mixing the curing agent into the trickle resin while the trickle resin flows in the path spaced from the outlet opening.

2. A method of trickle resin impregnation of n object to be impregnated, comprising the step of: applying a jet of liquid synthetic resin in conjunction with a curing agent on the object to be impregnated, the step of applying including supplying a trickle resin separately by way of an outlet opening free of the curing agent, causing the trickle resin to flow in a path between the outlet opening and the object to be impregnated, and mixing in the curing agent with the trickle resin when the trickle resin is in the path between the outlet opening and the object to be impregnated, the outlet opening being formed as a nozzle from which the trickle resin emerges downwards in jet form in free fall due to the action of gravity and strikes the object to be impregnated.

3. The method of claim 2, further comprising spraying the curing agent onto the jet form of trickle resin, which is in free fall, so as to thoroughly mix the curing agent with said jet form.

4. The method of claim 2, wherein the step of mixing in the curing agent includes spraying the curing agent by means of a ring nozzle (18) all-around onto an exterior surface of the trickle resin in jet form while the jet form passes through a center area of the ring nozzle.

5. The method of claim 2, wherein the applying step includes using at least one metering pump to supply in metered amounts at least one of the curing agent and the trickle resin free of the curing agent.

6. The method of claim 2, wherein the step of applying includes apportioning supply of at least one of the curing agent and the trickle resin free of the curing agent by controlled cross-sectional constrictions at respective outlets.

7. The method of the claim 2, wherein a carrier liquid is added to the curing agent before the mixing with the trickle resin.

8. The method of claim 7, wherein the carrier liquid is added to the curing agent initially and forms a prepared mixture with the curing agent, the step of mixing including applying the prepared mixture through a ring nozzle.

9. The method of claim 7, further comprising the step of containing the curing agent liquid in a separate container (III) and adding the curing agent in metered fashion to a line which is arranged for supplying the curing agent to a ring nozzle.

10. The method of claim 7, further comprising the step of preheating the trickle resin, curing agent and carrier liquid in respective storage containers (I, II, III).

11. The method of claim 7, further comprising the steps of moving the object to be impregnated and of determining apportionment of at least one of the trickle resin, the curing agent, and the carrier liquid, as well as a relative advance and movement rate of the object to be impregnated, with an electronic central control system.

12. The method of claim 2, further comprising the step of moving the object to be impregnated during the step of applying.

* * * * *